March 8, 1960     H. MOORE     2,927,332
METHOD OF MAKING A SETSCREW
Filed Nov. 12, 1957
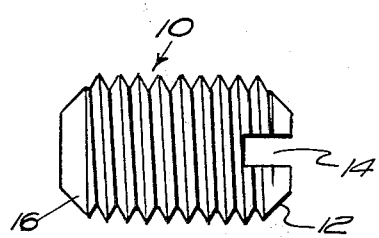
FIG. 1
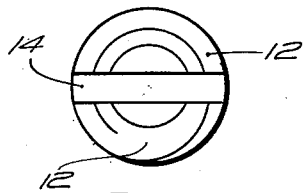
FIG. 4
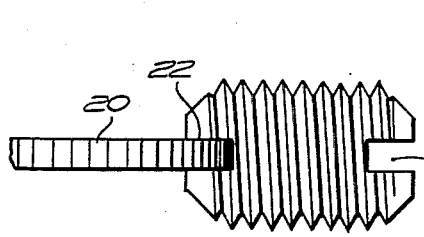
FIG. 2
FIG. 7
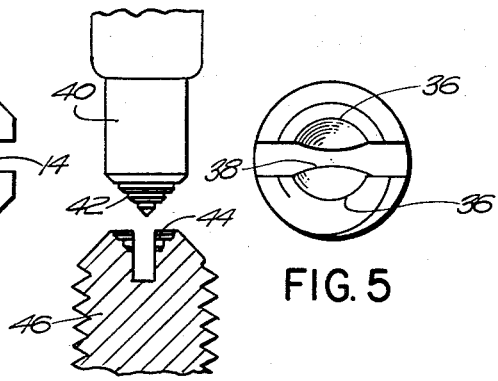
FIG. 5
FIG. 6
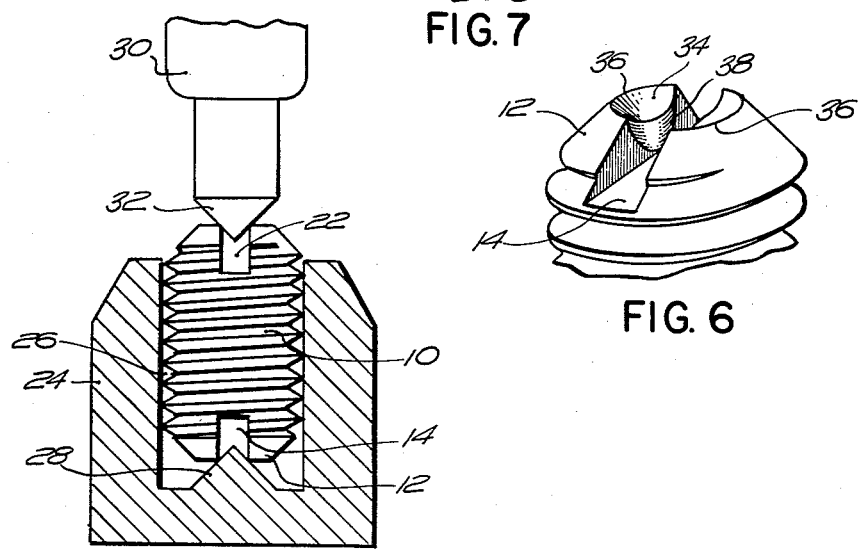
FIG. 3
*INVENTOR.*
HARRINGTON MOORE
BY Morse + Altman
ATTORNEYS

United States Patent Office 2,927,332
Patented Mar. 8, 1960

2,927,332

METHOD OF MAKING A SETSCREW

Harrington Moore, East Acton, Mass.

Application November 12, 1957, Serial No. 695,807

1 Claim. (Cl. 10—10)

This application is a continuation-in-part of my co-pending applications Serial No. 574,719, filed March 29, 1956 and Serial No. 585,766, filed May 18, 1956, and now abandoned. The invention relates to an improved and economical method of making setscrews of the cup-ended type. The method is advantageous in making single-ended setscrews, and is more advantageous in making double-ended setscrews. While not limited to any particular size of screw, the following description of the invention relates more especially to the more commonly used sizes of setscrews, that is, those having diameters of ¼" to ½".

In making cup-ended setscrews according to the invention, the cups are formed by a swaging operation which is quicker and cheaper than the usual method of using a turning or drilling tool. The swaging step is performed after the screw thread has been formed and the end has been bevelled to form the outer wall of the cup. In swaging an end of a screw to form a cup therein, a certain amount of metal has to be displaced, this resulting in a deformation of the adjacent convolutions of the screw thread unless certain conditions are met as hereinafter described. According to the invention, a transverse slot is cut in the end prior to the swaging step so that the displaced metal has somewhere to go without mushrooming the end of the screw. For successful operation, the width and depth of the slot must be definitely related to the diameter of the screw.

For a more complete understanding of the invention reference may be had to the following description thereof, and to the drawing, of which—

Figure 1 is a side elevation of a piece of rod stock which has been screw-threaded, severed from the supply, bevelled at both ends, and slotted at one end;

Figure 2 is an elevation of the screw shown in Figure 1, and a saw cutting a slot in the other end;

Figure 3 is a sectional view of a hollow die with a screw therein and an upper die above the screw;

Figure 4 is an end view of the screw shown in Figure 3 before it is swaged;

Figure 5 is an end view of the screw after it has been swaged;

Figure 6 is a fragmentary perspective view of a finished screw; and

Figure 7 is a fragmentary sectional view of a modified form of screw with an upper die above it.

Automatic machines are commonly used to make headless setscrews in quantity. Rod or wire stock of indeterminate length is fed into such machines and after the leading end portion has been operated on it is cut off and transferred to another machine for whatever further operations may be required to complete the screw of the kind desired. According to the present invention a piece of stock which has been threaded, bevelled and slotted is cut off from the stock piece, the cut-off end being bevelled in the process. This results in an unfinished screw 10, as illustrated in Figure 1, with one end bevelled as at 12 and slotted as at 14, the cut-off end being bevelled as at 16.

The cut-off end is then presented to a saw 20 which cuts a slot 22 in that end. Both ends of the screw are now similar. In the next step, by which conical cups are swaged in the ends of the screw, the slots 14 and 22 provide space into which the metal displaced in the swaging process can flow. The swaging stresses on the screw are severe and the dimensions of the slot are therefore quite critical. The width of the slot must be approximately equal to one fifth of the crest diameter of the screw, that is, the diameter of the stock of which the screw is made. Likewise, the depth of the slot must be approximately equal to one third of the stock diameter. Substantial departures from these dimensions result in undesirable distortion of the end of the screw by the swaging die.

The screw 10 with a slot in each end is placed in a cup-shaped anvil or die 24 having a cylindrical cavity 26 fitted by the screw. A conical boss 28 projects up from the center of the floor of the cavity 26. This boss has an apex angle of sufficient size, say 45°, so that the apex enters a short distance into the slot 14 when the screw is placed in the die. Above the die 24 is a vertically movable die 30 having at its lower extremity a conical tip 32 preferably of the same size and shape as the boss 28. When a screw 10 is in place in the lower die 24, the top of the screw is struck heavily by the tip of the upper die 30. The blow forces the tip 32 into the upper slot 22 of the screw and at the same time forces the boss 28 into the lower slot 14. This forms a conical recess 34 simultaneously in each end of the screw. These recesses together with the surrounding bevelled surfaces 12 and 16 form circular edges 36 at each end of the screw. The recesses 34 and edges 36 are intersected by the slots 14 and 22 respectively so that each edge 36 consists of two separate arcs. When the ends of the screw are swaged to form the recesses 34, the metal displaced by the dies bulges into the slots 14 and 22 as indicated at 38 in Figures 5 and 6. Since the slots provide space into which displaced metal can freely move, the power required for the swaging blow is far less than that which would be necessary without the slots or equivalent space and distortion of the thread is avoided.

The conical dies which are driven into the slots in the ends of the screw may be circumferentially grooved. Such dies form complemental ridges and grooves in the resulting cups in the ends of the screw. In Figure 7 is shown a die 40 having a conical tip 42 which is circumferentially grooved. The die has indented a cup 44 in a slotted end of a screw 46, the cup being intersected by the slot. The inner walls of the cup have one or more ridges and grooves complemental to the grooves and ridges on the die tip 42. A screw with a cup formed thus is found to have excellent holding power.

I claim:

A method of making a setscrew which comprises bevelling both ends of a piece of screw-threaded rod stock radially inwardly from the ends of the screw threads, cutting in each said end a diametral slot to a depth equal to approximately one-third of the maximum diameter of said stock and with a width equal to approximately one-fifth of the said diameter of the stock, and simultaneously swaging in both said ends conical cups of sufficient diameter to form sharp edges with the bevelled surfaces.

References Cited in the file of this patent

UNITED STATES PATENTS

| | | |
|---|---|---|
| 2,295,314 | Whitney | Sept. 8, 1942 |
| 2,631,635 | Klooz | Mar. 17, 1953 |
| 2,676,510 | Hodell | Apr. 27, 1954 |
| 2,727,256 | Moore | Dec. 20, 1955 |

FOREIGN PATENTS

| | | |
|---|---|---|
| 6,146 | Great Britain | Mar. 12, 1912 |